United States Patent [19]

Schmitt

[11] 4,346,541

[45] Aug. 31, 1982

[54] BUILDING PANEL CONSTRUCTION AND PANEL ASSEMBLIES UTILIZING SAME

[75] Inventor: Robert F. Schmitt, Berea, Ohio

[73] Assignee: G & S Company, Strongsville, Ohio

[21] Appl. No.: 169,712

[22] Filed: Jul. 17, 1980

Related U.S. Application Data

[63] Continuation of Ser. No. 938,383, Aug. 31, 1978, abandoned.

[51] Int. Cl.³ .............................................. E04C 1/00
[52] U.S. Cl. .................................. 52/309.11; 52/544; 52/553; 52/799
[58] Field of Search ................ 52/795, 799, 608, 609, 52/533, 540, 544, 553, 520, 309.5, 309.9, 309.11, 309.14

[56] References Cited

U.S. PATENT DOCUMENTS

| | | | |
|---|---|---|---|
| 1,925,453 | 9/1933 | Mazer | 52/799 |
| 2,065,433 | 12/1936 | Dercum | 52/799 |
| 2,358,550 | 9/1944 | Williams | 52/540 |
| 2,427,879 | 9/1947 | Robertson | 52/541 |
| 2,616,283 | 11/1952 | Branstrator | 52/795 |
| 2,641,029 | 6/1953 | Trimmer | 52/ |
| 3,174,256 | 3/1965 | Lockwood | 52/547 |
| 3,192,099 | 6/1965 | Beckman | 52/309 |
| 3,246,058 | 4/1966 | Voelker | 52/ |
| 3,364,638 | 1/1968 | Santangelo | 52/309.1 |
| 3,368,473 | 2/1968 | Sohda | 52/799 |
| 3,408,786 | 11/1968 | Snyker | 52/547 |
| 3,771,271 | 11/1973 | Keel | 52/540 |
| 3,854,260 | 12/1974 | O'Hanlon | 52/309.5 |
| 3,971,184 | 7/1976 | Van Wagoner | 52/173 R |
| 4,057,936 | 11/1977 | Wyatt | 52/799 |
| 4,059,933 | 11/1977 | Funk | 52/464 |
| 4,070,839 | 1/1978 | Clem | 52/169.14 |

FOREIGN PATENT DOCUMENTS

| | | | |
|---|---|---|---|
| 1265957 | 11/1968 | Fed. Rep. of Germany | 52/468 |
| 2043030 | 4/1971 | Fed. Rep. of Germany | 52/169.11 |

*Primary Examiner*—Price C. Faw, Jr.
*Assistant Examiner*—Henry E. Raduazo

*Attorney, Agent, or Firm*—Maky, Renner, Otto & Boisselle

[57] ABSTRACT

A building panel having opposite sides and parallel beveled edges defined respectively by facing sheets and by the parallel sides of the first and last trapezoidal corrugations of a longitudinally corrugated sheet sandwiched between the facing sheets, the longitudinally extending trapezoidal spaces between the corrugated sheet and the facing sheets being filled with urethane or like insulating foam which bonds the facing and corrugated sheets together and forms a strong monolithic section. The facing sheets and corrugations are preferably made of cardboard, and the facing sheets desirably have colored, patterned or textured surfaces. The panel herein is further characterized in that a reinforcing, weatherproofing, and protective skin of translucent or transparent plastic is applied over the sides and edges of the panel through which the colored, patterned, or textured surfaces of the facing sheets are visible.

The parallel beveled edges of the panels permit such panels to be assembled in edge-to-edge sealed relation over a foundation wall, or in partially overlapped and sealed relation on the rafters of a sloping roof, or in side-by-side relation with resilient strips therebetween on a flat or sloping roof. When used as horizontal siding in home construction, the edges of the panels may be placed in abutting engagement with such edges sloping downwardly away from the structure so that the joints are self-draining. A suitable caulking material may also be placed between the joints to provide a better seal between panels if desired. Alternately, the panel edges may be provided with extruded plastic or like strips for nailing directly to the wall studs and for interlocking the edges of successive panels in partially offset relation to resemble conventional siding construction. When used as vertical or diagonal siding in home construction, caulking may also be provided at the joints, or plastic coated and foam filled cardboard battens may be provided and sealed between successive panels or sealing strips may bridge the joints between adjacent panels.

43 Claims, 15 Drawing Figures

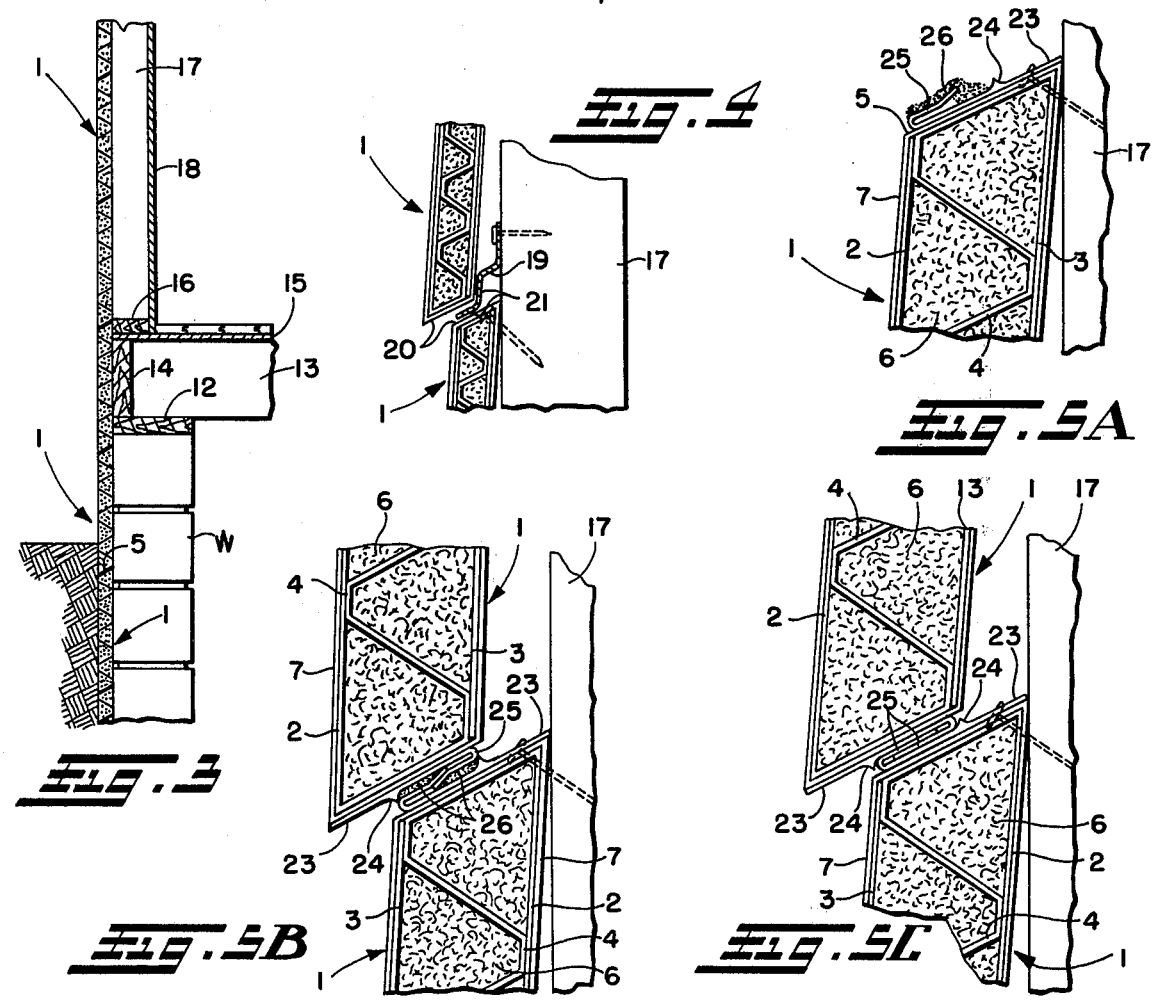

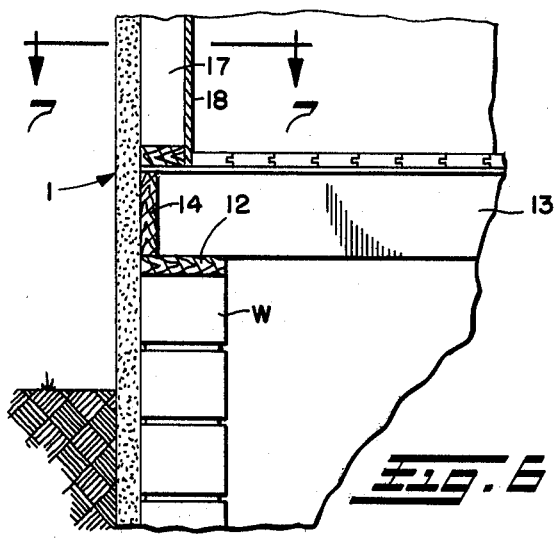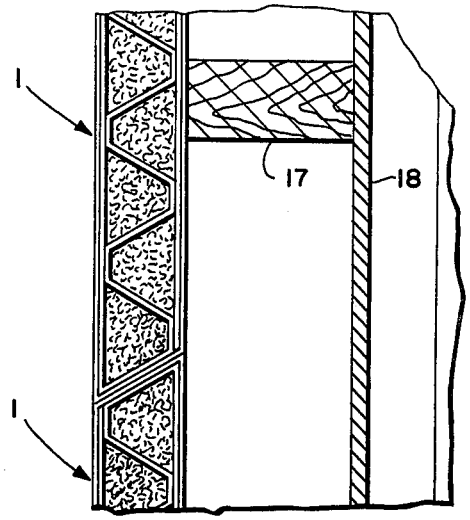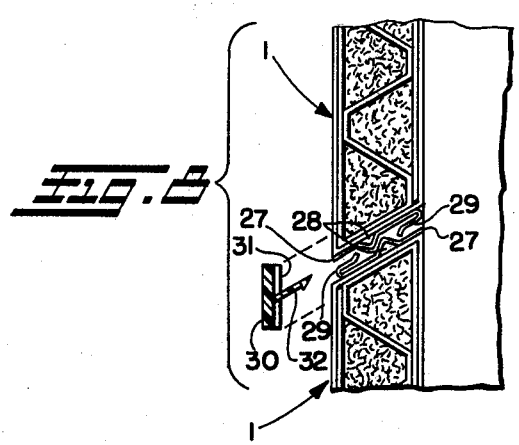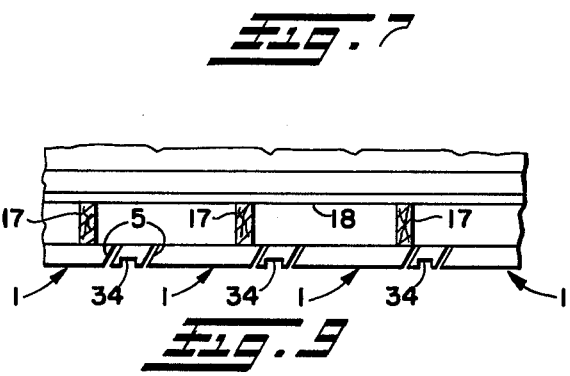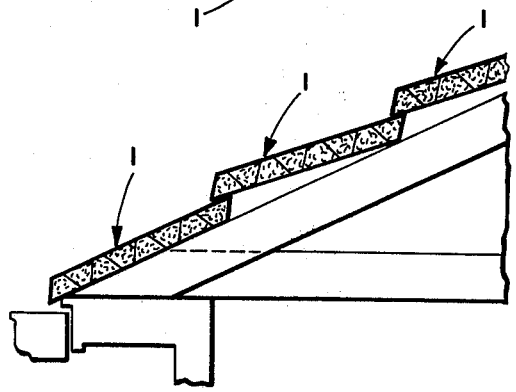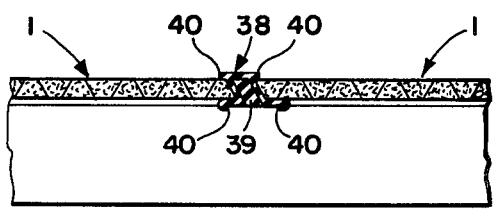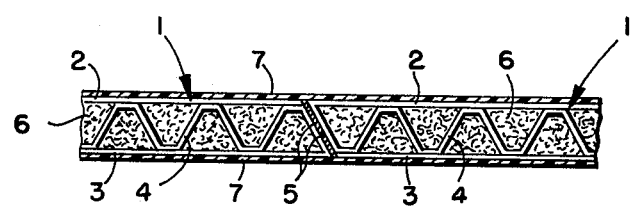

BUILDING PANEL CONSTRUCTION AND PANEL ASSEMBLIES UTILIZING SAME

This is a continuation of application Ser. No. 938,383, filed Aug. 31, 1978.

BACKGROUND OF THE INVENTION

In the packaging field it is known to partly or wholly fill spaces in corrugated paperboard with sulphur foam (Jacquelin U.S. Pat. No. 3,787,276), with urethane foam (Rodgers, Jr. U.S. Pat. No. 2,973,295), or with injection molded thermoplastic material such as polyethylene, polypropylene or styrene (Santangelo U.S. Pat. No. 3,364,638). In cases where water seepage resistance is necessary corrugated paperboard panels may be rendered moisture impervious by filling the spaces with colloidal clay such as bentonite (Clem U.S. Pat. No. 3,186,896).

It has also been proposed to use corrugated paperboard panels filled as with asbestos fibers and expanded perlite particles as building panels in much the same manner as plywood sheets are currently used (Wandel U.S. Pat. No. 3,449,157). Another known form of laminated building sheet or panel comprises a corrugated metal spacing member with holes through the sidewalls of the corrugations sandwiched between metal facing sheets with the spaces between the facing sheets and corrugated sheet being filled with cellular asbestos having the cells thereof disposed transversely to the corrugations and keyed in the holes in the sidewalls of the corrugations (Coffman U.S. Pat. No. 2,234,517).

SUMMARY OF THE INVENTION

In contradistinction to known laminated sheets or panels, the panel constituting the present invention is of a plank-like form having opposite sides defined by facing sheets and parallel beveled edges defined by the sides of the first and last corrugations of a trapezoidally corrugated sheet sandwiched between the facing sheets, with the trapezoidal spaces between the facing sheets and the corrugated sheet being filled with low density closed cell urethane or the like insulating foam which is foamed in place. The parallel beveled edges of the panels facilitate use of the panels in making either a butt or lapped joint between adjacent panels in a manner to be subsequently described. Preferably, the outer facing sheets and corrugated sheet are made of a suitable cardboard-like material because of its relatively low cost and ease of forming. For exterior use on a building construction, the opposite sides and edges of the panels may be colored, patterned or textured, and a weatherproofing, reinforcing, and protective skin may be placed thereover thereby resulting in a lightweight, strong, dimensionally stable, and thermal and sound insulating panel adapted to be installed directly over the wall studs of a new building without requiring sheathing or without requiring insulation between the studs. Also, such panels may be placed directly over existing wall and roof structures for use in insulating existing structures less expensively and more effectively than other known methods presently being used. Presently there is no effective and economical way to fill the sidewalls of an existing structure with insulation. The panels of the present invention not only insulate more effectively and economically, but also provide an attractive long life siding. The weatherproof coating and urethane also permit such panels to extend below ground level for effective insulation of both the foundation as well as the area where the foundation structure meets the floor joists, and is particularly applicable to the retrofitting of old houses and other existing structures. Insulating such area between the foundation and floor joists is especially important for energy conservation, and yet until now there has been no known way effectively and economically to provide such insulation.

One or more of such panels may also be adhesively bonded together before the outer protective skin is applied over the sides and outermost edges of the joined panels to provide a single multiple width panel of any desired width.

For interior use, the panel herein without the weatherproofing skin may be installed on the inside of the wall studs of a new building or over the existing wall of an old structure to provide increased insulation. The visible exterior surfaces of the panels used for interior use may also be colored, patterned or textured as in the case of the panels for exterior use, and such interior panels may also be covered with wallpaper or paneling if desired.

The plank-like panels herein may be face nailed in place, or oppositely disposed longitudinally extending strips may be applied along the edges thereof for interlocking the edges of successive panels in partially offset relation and for facilitating the nailing of successive upper edges of the panels directly to the wall studs of a building wall. For vertical or diagonal application of the panels herein over the wall studs or existing wall panels, a suitable caulking material may be used between the joints, or rigid insulating foam filled cardboard battens may be bonded and sealed between the beveled edges of successive panels or the edges of successive panels may be provided with interlocking strips to retain the panels in coplanar relation with sealing strips bridging the joints between the panels.

While the use of cardboard sheets for making the panels is preferred, it will be apparent that other materials could be used if desired. For example, the panels could be made out of a one-piece extruded aluminum shape or extruded plastic and filled with urethane.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 1 is a perspective view of one form of panel constituting the present invention;

FIGS. 2A and 2B are perspective views of molds for manufacturing a panel similar to that of FIG. 1;

FIG. 3 is a fragmentary vertical cross-section view of a building construction showing the panels according to the present invention in assembled relation over the foundation and exterior walls of the building construction;

FIG. 4 is a fragmentary cross-section view showing a kickout strip nailed to the studs for offsetting the juxtaposed edges of successive panels to resemble a conventional siding construction;

FIGS. 5A, 5B, and 5C illustrate another form of panel installation in which each panel has oppositely disposed strips on its upper and lower edges for nailing of the upper edges of successive panels to the studs and for interlocking successive panels in offset relation to resemble a conventional siding construction;

FIG. 6 is a fragmentary cross-section view similar to FIG. 3 except showing the panels according to the present invention assembled in vertically extending side-by-side relation;

FIG. 7 is a cross-section view along line 7—7 of FIG. 6 but on an enlarged scale showing the edges of adjacent panels in abutting engagement with caulking material therebetween;

FIG. 8 is a cross-section view similar to FIG. 7 but showing how the edges of successive panels may be interlocked together with the joints covered and sealed by a joint strip of plastic or like material;

FIG. 9 illustrates another vertical (or diagonal) panel assembly similar to FIG. 6 with intervening battens between the spaced apart edges of successive panels;

FIG. 10 illustrates a panel assembly applied on the rafters of a sloping roof;

FIG. 11 illustrates an assembly of panels applied on a flat or sloping roof having compression joints between successive panels; and FIG. 12 is a side elevation view showing two or more panels in abutting engagement along adjacent edges, bonded together, and having a one-piece outer layer of glass fiber reinforced plastic covering the sides of such panels and extending over the joints therebetween to provide a single multiple width panel.

DETAILED DESCRIPTION OF THE PREFERRED EMBODIMENTS

The panel 1 illustrated in FIG. 1 comprises parallel cardboard facing sheets 2 and 3 with a trapeozoidally corrugated cardboard sheet 4 sandwiched between the facing sheets 2 and 3 with the flat crests of the corrugated sheet 4 contacting the respective facing sheets 2 and 3. The parallel beveled edges 5 of the panel 1 are defined by the sides of the first and last corrugations. The longitudinally extending trapeozoidal spaces defined between the facing sheets 2 and 3 and the corrugated sheet 4 are filled with a closed cell low density insulating foam 6, preferably urethane, which has a thermal conductivity (k-factor) from about 0.11 to 0.17 BTU/sq. ft./hr./°F./in., and has excellent adhesive properties. As the urethane rises and expands during foaming, it adheres to the surfaces of the facing and corrugated sheets 2, 3, and 4 which define the trapeozoidal spaces thus serving to retain the entire system together and form a very strong monolithic section providing the basic module on which color, print, or texture may be applied. Afterwards, the opposite sides 2 and 3 and edges 5 of the panel are covered by a reinforcing, protective and weatherproofing skin 7 of glass fiber reinforced plastic or other similar and suitable material. The skin 7 is preferably translucent or transparent so that the opposite sides 2 and 3 and edges 5 of the panel, if colored, patterned, textured or otherwise finished as aforesaid, will be visible through the skin 7 for appearance while protected by the skin 7 from weather or other damage.

In one example of a panel 1 according to the present invention, the panel was made approximately 1½" thick and the opposite sides 2 and 3 approximately 12" wide, using cardboard for both the facing sheets 2 and 3 and corrugated sheet 4 approximately 0.050" thick. The skin 7 was likewise approximately 0.050" thick. The panel 1 according to the illustrative example has a density of about 2.3 lbs./cu. ft. In this example the pitch of the corrugations was approximately 3" and the crests of the corrugations were about ¾" wide.

As known, low density urethane foam is one of the most efficient thermal insulations commercially available with initial thermal conductivity (k-factor) in the range of 0.11 to 0.14 BTU/in./sq. ft./°F./hr. for 2 lb./cu. ft. foam. Of course, the lower the k-factor the more efficient the insulation. The usual densities of spray foam are from 2 to 6 lbs./cu. ft. depending on the strength and rigidity required. Proposed federal regulations may require new buildings in northern states to have thermal resistances (R-factors) of 19 sq. ft./°F./hr./BTU.

If a panel according to FIG. 1 is desired in 2, 3, or 4 foot widths, the edges 5 of two, three, or four panels 1 without the skin 7 may be adhesively bonded together to form the desired width of panel and then the glass fiber reinforced skin 7 may be applied over the sides and outermost edges of the multiple width panel, as illustratively shown in FIG. 12.

In another example of a panel 1 according to the present invention, the facing sheets 2 and 3 and the corrugated sheet 4 were made of cardboard of 0.080" thickness with a fiber glass reinforced skin 0.025" thickness, the thickness of the panel 1 being 3½" and the pitch of the corrugations being 2" with flat crests of ¾". It was found that such panel when supported by supports five feet apart crosswise of the corrugations supported an 844 lb. load with a total initial deflection of about 0.205 inch. The total cross section moment of inertia was about 20 in.$^4$ and the apparent composite modulus of elasticity was $0.924 \times 10^6$ psi. The total composite R-factor using urethane foam of 2.2 lb./cu. ft. density was R-24 and using urea foam at 2.2 lb./cu. ft. was R-19.

In the panel illustrated in FIG. 1, the facing sheets 2 and 3 and corrugateed sheet 4 are shown as comprising a single sheet of cardboard which is scored and folded first to form one facing sheet 2, then the corrugated sheet 4, and lastly the other facing sheet 3. Alternatively, the facing sheets 2 and 3 and corrugated sheet 4 are each made from separate sheets.

FIGS. 2A and 2B schematically illustrate how a panel 1 according to the present invention may be constructed using separate sheets for the facing sheets 2 and 3 and corrugated sheet 4. In FIG. 2A the corrugated sheet 4 is placed on a corrugated lower mold section 8 and measured amounts of a suitable foam mixture of urethane or the like are introduced into the upwardly facing open triangular sections. Immediately thereafter the facing sheet 2 is placed over the corrugated sheet and restrained in place by the upper mold section 9 until foaming is complete and the plastic material has cured. The adhesive qualities of the urethane cause the facing sheet 2 and half foamed corrugated sheet 4 to become a monolithic structure. The partially completed panel as formed in the mold 8-9 of FIG. 2A is then inverted and placed in the lower mold section 10 of FIG. 2B and the foam plastic mixture is placed into the valleys of the corrugations and the other facing sheet 3 is placed against the crests of the corrugations whereupon the foam plastic may be cured with the upper mold section 11 of FIG. 2B clamped in place to form a finished panel comprising the facing sheets 2 and 3 bonded to the corrugated sheet 4 and the rigid foam which fills the longitudinally extending trapeozoidal spaces defined between the facing sheets 2 and 3 and the corrugated sheet 4. The panel 1 made according to FIGS. 2A and 2B may then be covered by the glass fiber reinforced plastic skin 7 as depicted in FIG. 1.

In FIG. 3 the panels 1 are assembled in horizontally extending edge-to-edge relation over the foundation wall W of a building above and below grade to form a thermal insulating barrier for the foundation wall W. The parallel beveled edges 5 of adjacent panels are shown in full contacting abutting engagement with each other and sloping outwardly and downwardly away from the foundation wall thus to aid in keeping water and moisture from seeping between adjacent panels. The edges 5 of the panels 1 are also preferably sealed by applying a suitable caulking material between the abutting edges 5 as the panels 1 are put in place. In addition, the rear sides of the panels 5 may be adhesively and sealingly secured to the outside of the foundation wall W, or such panels may be secured in place by nailing and the like.

In conventional home construction as shown in FIG. 3 the top of the foundation wall W has secured thereon a plate 12 upon which the floor joists 13 are supported. Across the ends of the joists 13 is a framing member 14 which boxes in the floor structure to form a support for the subfloor 15 and for the plate 16 for the wall studs 17. The inside wall 18 of the structure shown in FIG. 3 may comprise the usual dry wall or plaster board nailed to the studs 17. In the building construction shown in FIG. 3, the panels 1 above grade are shown installed to resemble horizontal siding with the parallel beveled edges of adjacent panels in full contacting abutting engagement with each other and sloping downwardly and outwardly to prevent water from seeping in between the joints and make the joint self-draining. The panels may be secured in place as by face nailing, and a suitable caulking material may be applied between the joints as required. The exterior panel siding desirably extends below ground level at least a foot or so to effectively insulate the area where the foundation structure meets the floor joists, and such siding may continue to the full depth of the foundation as shown. The weatherproof coating and urethane protect such panels against deterioration for long life both above and below ground level, and such panels not only provide more effective and economical insulation for structures than other known methods, but also provide an attractive long life siding.

In FIG. 4, the panels are also shown installed to resemble horizontal siding, similar to FIG. 3, but with the lower edges of the panels 1 outwardly offset with respect to the upper edges of the panels 1 which may be nailed directly to the studs 17. The offsetting may be achieved as by kickout strips 19 of metal or plastic also nailed to the studs 17. Each panel 1 may have a sealant and adhesive 20 applied to its upper and lower edges to bond and seal the panel edges to the flanges 21 of the kickout strip 19. As shown, the beveled panel edges slope downwardly and outwardly from the building structure to facilitate water runoff and aid in keeping water and moisture from seeping in between adjacent panels.

In the siding installation shown in FIGS. 5A, 5B and 5C the upper edge 5 of each panel 1 has adhesively bonded thereto an extruded plastic strip 23 or the like having a series of holes therein of which at least one hole registers with each stud 17 for nailing as shown in FIG. 5A, said strip 23 having a ridge 24 between its ends and a rearwardly extending flange 25 at its outer end on which a suitable adhesive or caulking like material 26 is adapted to be applied. The lower edge 5 of each panel 1 has an oppositely disposed extruded plastic strip 23 bonded thereto to provide a downwardly extending ridge 24 between its ends and a forwardly directed flange 25 arranged to cooperate with the flange 25 on the strip 23 on the upper edge 5 of the panel 1, FIG. 5B showing the partially interengaged flanges 25 and FIG. 5C showing the final interlocked position of the lower edge 5 of one panel 1 with the upper edge 5 of the adjacent panel 1 with outer ridge 24 forming a fillet and the sealant 26 being effective to seal the joint and to bond together the lower and upper edges 5 of adjacent panels 1.

FIGS. 6 and 7 illustrate an installation of such panels 1 in vertical side-by-side relation for use both as exterior siding insulation above ground level and extending below ground level for insulating the foundation as well. The edges of adjacent panels may be in close abutting engagement as shown in FIG. 7, with caulking material therebetween to provide a waterproof joint, and secured in place as by face nailing. Alternatively, the edges of adjacent panels may be provided with cooperating oppositely disposed strips 27 having ridges 28 and hook-like flanges 29 which cooperate to retain the panels in flush relationship as shown in FIG. 8. The vertical joints may also be sealed as by a batten or strip 30 made, for example, of plastic or a corrugated board core with fiber glass coating, and having a pressure sensitive adhesive coating 31 and a flange 32 parallel to the beveled edges of the panels and having a hook to engage between the end of the outer flange 29 and the ridge 28 when the strip 30 is pushed into place to bridge and seal the joint. In view of the stiffness and dimensional stability of the panels 1 herein it is not necessary when installing the panels vertically as shown in FIGS. 6 and 7 to attach the panels 1 to the studs 17 whereby it suffices to bond the panels 1 to the foundation wall W, and to the bottom and top of the stud wall.

FIG. 9 is a fragmentary cross-section view of another installation of the panels 1 herein in vertical (or diagonal) position and employing decorative battens 34 between the edges 5 of the panels 1 which, like the panels 1, may comprise rigid foam filled cardboard having a plastic skin. As shown in FIG. 9 the panels 1 are spaced apart with the battens 34 therebetween adhesively and sealingly bonded to the edges of the panels 1. Such panels and battens may also be secured in place as by face nailing, with suitable caulking between joints to provide the desired seal.

FIG. 10 shows the use of panels 1 according to the present invention on a sloping roof, the panels being secured together in overlapping relation and being secured to the rafters as by adhesive or nailing.

FIG. 11 illustrates the application of the panels 1 herein to a flat (or sloping) roof with elastomeric compression joints 38 including for example a foam rubber core 39 and flanges 40 which sealingly embrace opposite sides of the panels 1. The FIG. 11 construction may also be applied on a sloped roof and in either case the panels 1 are preferably of two, three, or four foot widths fabricated as previously mentioned by adhesively bonding together and abutting edges of the cardboard sides of corrugated sheets 4 followed by applying the glass fiber reinforced plastic skin 7 around the sides 2 and 3 and edges 5 of the individual two, three or four foot wide panels 1.

Also as previously mentioned, the panels 1 herein without the outer skin 7 may be installed interiorly in vertical or horizontal position to form an interior wall surface suitable for painting, wallpapering, or paneling as in the case of the conventional dry wall construction 18 but providing extra insulation together with the insulation of the exteriorly applied panels 1. In any case, by using the panels 1 herein it is not necessary to have any insulation between the studs 17.

The panel 1 herein has an almost limitless potential of designs, patterns, colors and textures because the color, texture and/or design is applied to the cardboard surfaces of the facing sheets 2 and 3 of the basic panel either before or after it is produced and filled with rigid insulating foam 6. The color or design may be printed on the cardboard or applied to the cardboard surfaces with inexpensive materials over which the transparent or translucent plastic skin 7 is applied. The truss-like internal structure of the panel 1 herein together with the integral foam support 6 produces a panel 1 with relatively great stiffness which approximates the modulus of elasticity of many grades of lumber and which contributes greatly to the allowable span of the panel 1 herein. In sections of greater depth or thickness this stiffness factor will be adequate for residential load bearing exterior and interior walls. It is also preferred that panels 1 herein be made in relatively long lengths which may readily be sawed to desired lengths to avoid end-to-end joints as in the installations depicted in FIGS. 3 to 11.

Moreover, the panels may be used in new building construction either as exterior or interior finish sheeting or both in lieu of the usual siding or sheeting, and such panels may also be placed directly over existing wall and roof structures to provide desired insulation much more effectively and less expensively than other known methods presently in use.

While the use of cardboard to make the panels is preferred because of its relatively low cost and ease of forming, the panels could also be made from other materials, including a one-piece extruded aluminum shape or extruded plastic panel filled with urethane and the like.

Although the invention has been shown and described with respect to several preferred embodiments, it is obvious that equivalent alterations and modifications will occur to others skilled in the art upon the reading and understanding of this specification. The present invention includes all such equivalent alterations and modifications and is limited only by the scope of the claims.

The embodiments of the invention in which an exclusive property or privilege is claimed are defined as follows:

1. A building panel construction comprising a pair of facing sheets defining opposite sides of the panel; a trapezoidally corrugated sheet sandwiched between said facing sheets, the corrugations of said corrugated sheet having oppositely facing flat crests engaging said facing sheets, the first and last corrugations of said corrugated sheet having flat sides defining opposite beveled parallel edges of said panel adapted for butted engagement with the beveled edge of another panel; said edges of said panel having oppositely disposed longitudinally extending strips attached thereon for interlocking engagement with strips on the edges of adjacent panels; and rigid foam insulation filling the trapezoidal spaces defined between said facing sheets and corrugated sheet and bonded to the facing sheets and corrugated sheet.

2. The panel construction of claim 1 wherein said strips are operative to interlock the edges of adjacent panels in offset relation.

3. The panel construction of claim 2 wherein said strips are perforated to facilitate nailing of the upper edges of horizontally extending panels to wall studs adjacent the acute angle corners of such upper edges.

4. The panel construction of claim 1 wherein said strips are operative to interlock adjacent panels in flush relationship.

5. The panel construction of claim 4 wherein a sealing strip bridges the joint between the edges of adjacent panels.

6. In a building construction including exterior vertical walls, the combination therewith of a plurality of building panels overlying said vertical walls, each panel comprising a pair of facing sheets defining the opposite sides of the panel, a trapezoidally corrugated sheet sandwiched between said facing sheets, the sides of the first and last corrugations being flat and defining parallel beveled edges of said panel adapted for butted engagement with the beveled edge of another panel, and rigid foam insulation filling the trapezoidal spaces defined between said facing sheets and said corrugated sheet and bonded to said facing sheets and corrugated sheet, the exterior surface of said panel being weatherproof; said panels extending generally horizontally and being assembled with said edges of adjacent panels in sealed abutting offset relation to resemble conventional siding construction and to provide a weatherproof and insulating layer over said exterior vertical wall, said panels disposed in offset relation having longitudinally extending strips for interlocking said panels in predetermined offset relation, and said strips adjacent the acute angle corners of the upper edges of successive panels being nailed to said exterior vertical walls.

7. In a building construction including exterior vertical walls, the combination therewith of a plurality of building panels overlying said vertical walls, each panel comprising a pair of facing sheets defining the opposite sides of the panel, a trapezoidally corrugated sheet sandwiched between said facing sheets, the sides of the first and last corrugations being flat and defining parallel beveled edges of said panel adapted for butted engagement with the beveled edge of another panel, and rigid foam insulation filling the trapezoidal spaces defined between said facing sheets and said corrugated sheet and bonded to said facing sheets and corrugated sheet, the exterior surface of said panel being weatherproof; said panels being assembled in vertical side-by-side relation with said edges of adjacent panels in sealed butted relation to provide a weatherproof and insulating layer over said exterior vertical wall, said panels having elongated strips along the opposite edges thereof which interlock with the strips of adjacent panels, and sealing strips bridging the joints between adjacent panels to form a sealed wall construction overlying said exterior vertical walls.

8. In a building construction including exterior vertical walls, the combination therewith of a plurality of building panels overlying said vertical walls, each panel comprising a pair of facing sheets defining the opposite sides of the panel, a trapezoidally corrugated sheet sandwiched between said facing sheets, the sides of the first and last corrugations being flat and defining parallel beveled edges of said panel adapted for butted engagement with the beveled edge of another panel, and rigid foam insulation filling the trapezoidal spaces defined between said facing sheets and said corrugated sheet and bonded to said facing sheets and corrugated sheet, the exterior surface of said panel being weatherproof; said panels being assembled with said edges of adjacent panels in spaced side-by-side relation with rigid foam-filled battens sealingly bonded between the spaced apart edges of adjacent panels to provide a weatherproof and insulating layer over said exterior vertical wall.

9. In a building construction including exterior vertical walls and a roof structure, the combination therewith of a plurality of building panels overlying said roof structure; each panel comprising a pair of facing sheets defining the opposite sides of the panel, a trapezoidally corrugated sheet sandwiched between said facing sheets, the sides of the first and last corrugations being flat and defining parallel beveled edges of said panel adapted for butted engagement with the beveled edge of another panel, and rigid foam insulation filling the trapezoidal spaces between said facing sheets and said corrugated sheet and bonded to said facing sheets and corrugated sheet, the exterior surface of said panel being weatherproof; said panels being assembled with said edges of adjacent panels in sealed relation to provide a weatherproof and insulating layer over said roof structure, and elastomeric compression joints between the edges of adjacent panels, said joints including a foam rubber core and flanges which sealingly embrace opposite sides of said panels.

10. A building panel construction comprising a pair of facing sheets defining opposite sides of the panel; a corrugated sheet sandwiched between said facing sheets, said panel having opposite beveled flat parallel edges defined by the first and last corrugations of said corrugated sheet, said parallel edges extending from one facing sheet to the other at the opposite ends thereof adapted for butted engagement with the beveled edge of another panel; and rigid foam insulation filling the spaces defined between said facing sheets and corrugated sheet and bonded to the facing sheets and corrugated sheet.

11. The panel construction of claim 10 wherein said facing sheets and corrugated sheet are of cardboard.

12. The panel construction of claim 10 wherein the corrugations of said corrugated sheet have oppositely facing flat crests engaging said facing sheets.

13. The panel construction of claim 10 wherein said opposite sides and edges of said panel have a plastic protective, weatherproofing, and reinforcing skin thereover.

14. The panel construction of claim 13 wherein said plastic skin is translucent or transparent; and wherein the outer surfaces of said facing sheets are colored, patterned, or textured.

15. The panel construction of claim 13 wherein said skin has glass fibers therein imparting additional stiffness and strength to said panel.

16. The panel construction of claim 10 wherein at least two of said panels have abutting edges bonded together, and a unitary plastic protective, weatherproofing and reinforcing skin extends over the sides of said bonded panels and the outermost edges of the outermost bonded panels.

17. The panel construction of claim 10 wherein said facing sheets and said corrugated sheet comprise a single sheet of cardboard.

18. In a building construction including a foundation wall, the combination therewith of a plurality of building panels as set forth in claim 10 in side-by-side relation overlying said foundation wall; the exterior surface of said panels being weatherproof; said panels being assembled with said edges of adjacent panels in sealed butted relation to provide a weatherproof and insulating layer over said foundation wall.

19. The building construction of claim 18 wherein said panels extend generally horizontally with the edges of adjacent panels sloping downwardly and outwardly away from said foundation wall.

20. The building construction of claim 18 wherein said panels extend generally vertically with the edges of said panels being sealed in flush edge-to-edge relation.

21. The building construction of claim 18 further comprising a plastic skin overlying the opposite sides and edges of each of said panel.

22. The building construction of claim 18 wherein at least two of said panels have abutting edges bonded together, and a unitary plastic protective, weatherproofing and reinforcing skin extends over the sides of said bonded panels and outermost edges of the outermost bonded panels.

23. The building construction of claim 18 further including exterior vertical walls, the outermost surface of which comprises a plurality of said building panels.

24. The building construction of claim 23 wherein said exterior vertical walls include vertical exterior wall studs, said building panels overlying said wall studs and attached thereto.

25. The building construction of claim 23 wherein said exterior vertical walls include exterior siding, and said building panels overlie said exterior siding.

26. The building construction of claim 18 further including a roof structure the outermost surface of which comprises a plurality of said building panels.

27. The building structure of claim 26 wherein said roof structure includes an existing exterior roofing, said building panels overlying said existing roofing.

28. In a building construction including exterior vertical walls, the combination therewith of a plurality of building panels each as set forth in claim 10 overlying said vertical walls; said panels being assembled with said edges of adjacent panels in sealed butted relation to provide a weatherproof and insulating layer over said exterior vertical wall.

29. The building construction of claim 28 wherein said building panels extend generally horizontally, with the adjacent edges of said building panels being in abutting offset relation to resemble conventional siding construction.

30. The building construction of claim 28 wherein said facing sheets and corrugated sheets are made of cardboard.

31. The building construction of claim 30 wherein the opposite sides and edges of said panels have a plastic protective, weatherproofing, and reinforced skin thereover.

32. The building construction of claim 30 wherein at least two of said panels have abutting edges bonded together, and there is a unitary plastic protective, weatherproofing and reinforcing skin over the sides of said bonded panels and the outermost edges of the outermost bonded panels.

33. The building construction of claim 29 wherein said exterior vertical walls include exterior siding, said panels overlying said exterior siding.

34. The building construction of claim 28 wherein said exterior vertical walls include vertical external wall studs, said panels overlying said wall studs and attached thereto.

35. In a building construction including exterior vertical walls, the combination therewith of a plurality of building panels each as set forth in claim 10; said panels being assembled with said edges of adjacent panels in spaced side-by-side relation with rigid foam-filled battens sealingly bonded between the spaced apart edges of adjacent panels to provide a weatherproof and insulating layer over said exterior vertical walls.

36. In a building construction including exterior vertical walls and a roof structure, the combination therewith of a plurality of building panels each as set forth in claim 10 overlying said roof structure; said panels being assembled with said edges of adjacent panels in sealed butted relation to provide a weatherproof and insulating layer over said roof structure.

37. The building construction of claim 36 wherein said roof structure slopes, said panels being secured together in overlapping relation over said sloping roof structure and secured thereto.

38. In a building construction including interior vertical walls, the combination therewith of a plurality of building panels each as set forth in claim 10 in side-by-side butted relation overlying said vertical walls, said beveled edges of said panels being butted with said panels in line to define a layer of said panels overlying said vertical walls.

39. A building panel construction comprising a pair of facing sheets defining opposite sides of the panel; a corrugated sheet sandwiched between said facing sheets, said panel having opposite beveled flat parallel edges extending from one facing sheet to the other at the opposite ends thereof adapted for butted engagement with the beveled edge of another panel; said edges of said panel having oppositely disposed longitudinally extending strips attached thereon for mechanical interlocking engagement with strips on the edges of adjacent panels; and rigid foam insulation filling the spaces defined between said facing sheets and corrugated sheet and bonded to the facing sheets and corrugated sheet.

40. In a building construction including a foundation wall, the combination therewith of a plurality of building panels in side-by-side relation overlying said foundation wall; each building panel comprising a pair of facing sheets defining opposite sides of the panel, a corrugated sheet sandwiched between said facing sheets, said panel having opposite beveled flat parallel edges extending from one facing sheet to the other at the opposite ends thereof adapted for butted engagement with the beveled edge of another panel, and rigid foam insulation filling the spaces defined between said facing sheets and corrugated sheet and bonded to the facing sheets and corrugated sheet; the exterior surface of said panels being weatherproof; said panels being assembled with said edges of adjacent panels in sealed butted relation to provide a weatherproof and insulating layer over said foundation wall, and further including exterior vertical walls, the outermost surface of which comprises a plurality of said building panels, said building panels which comprise the outermost surface of said exterior walls extending generally horizontally and being assembled with said edges in sealed butting offset relation to resemble conventional siding construction, said panels disposed in offset relation having longitudinally extending strips for interlocking said panels in predetermined offset relation, and said strips adjacent the acute angle corners of the upper edges of successive panels being nailed to said exterior vertical walls.

41. In a building construction including exterior vertical walls, the combination therewith of a plurality of building panels overlying said vertical walls; each building panel including a pair of facing sheets defining opposite sides of the panel, a corrugated sheet sandwiched between said facing sheets, said panel having opposite beveled flat parallel edges extending from one facing sheet to the other at the opposite ends thereof adapted for butted engagement with the beveled edge of another panel, and rigid foam insulation filling the spaces defined between said facing sheets and corrugated sheet and bonded to the facing sheets and corrugated sheet; said panels being assembled with said edges of adjacent panels in sealed butted relation to provide a weatherproof and insulating layer over said exterior vertical wall; said panels extending generally horizontally and being assembled with said edges of adjacent panels in sealed abutting offset relation to resemble conventional siding construction, said panels disposed in offset relation having longitudinally extending strips for interlocking said panels in predetermined offset relation, said strips adjacent the acute angle corners of the upper edges of successive panels being nailed to said exterior vertical walls.

42. In a building construction including exterior vertical walls, the combination therewith of a plurality of building panels overlying said vertical walls; each building panel including a pair of facing sheets defining opposite sides of the panel, a corrugated sheet sandwiched between said facing sheets, said panel having opposite beveled flat parallel edges extending from one facing sheet to the other at the opposite ends thereof adapted for butted engagement with the beveled edge of another panel, and rigid foam insulation filling the spaces defined between said facing sheets and corrugated sheet and bonded to the facing sheets and corrugated sheet; said panels being assembled with said edges of adjacent panels in sealed butted relation to provide a weatherproof and insulating layer over said exterior vertical wall; said panels being assembled in vertical side-by-side relation with said edges of adjacent panels in sealed butted relation as aforesaid to provide a weatherproof and insulating layer over said exterior vertical walls, said panels having elongated strips along the opposite edges thereof which interlock with the strips of adjacent panels, and sealing strips bridging the joints between adjacent panels to form a sealed wall construction overlying said exterior vertical walls.

43. In a building construction including exterior vertical walls and a roof structure, the combination therewith of a plurality of building panels overlying said roof structure; each building panel including a pair of facing sheets defining opposite sides of the panel, a corrugated sheet sandwiched between said facing sheets, said panel having opposite beveled flat parallel edges extending from one facing sheet to the other at the opposite ends thereof adapted for butted engagement with the beveled edge of another panel, and rigid foam insulation filling the spaces defined between said facing sheets and corrugated sheet and bonded to the facing sheets and corrugated sheet; said panels being assembled with said edges of adjacent panels in sealed butted relation to provide a weatherproof and insulating layer over said roof structure; and elastomeric compression joints between the edges of adjacent panels, said joints including a foam rubber core and flanges which sealingly embrace opposite sides of said panels.

* * * * *